United States Patent [19]
Lambe et al.

[11] 4,359,698
[45] Nov. 16, 1982

[54] REFLECTING TYPE LIGHT MODULATOR

[75] Inventors: John J. Lambe, Birmingham; Shaun L. McCarthy, Ann Arbor, both of Mich.; Henry L. Stadler, Washington, D.C.

[73] Assignee: Ford Motor Company, Dearborn, Mich.

[21] Appl. No.: 167,259

[22] Filed: Jul. 9, 1980

[51] Int. Cl.³ .......................... G02F 1/28; G09F 9/30
[52] U.S. Cl. .................................. 332/7.51; 350/484; 340/815.24; 40/452
[58] Field of Search ............... 332/7.51; 350/266, 267, 350/484, 486, 489; 340/373, 378.1, 752, 764, 783; 40/452, 406

[56] References Cited

U.S. PATENT DOCUMENTS

| Re. 28,212 | 10/1974 | Marks | 350/267 |
|---|---|---|---|
| 1,963,496 | 6/1934 | Land | 350/267 |
| 2,792,752 | 5/1957 | Yeates et al. | 350/266 |
| 3,135,207 | 6/1964 | Brown et al. | 350/267 |
| 3,210,757 | 10/1965 | Jacob | 350/266 |
| 3,743,382 | 7/1973 | Rosenberg | 350/266 |
| 3,775,881 | 12/1973 | Salam | 340/764 |
| 3,825,927 | 7/1974 | Rossien | 340/378.1 |
| 3,876,288 | 4/1975 | Iwata et al. | 350/267 |
| 4,115,914 | 9/1978 | Stephenson | 340/783 |
| 4,245,886 | 1/1981 | Kolodzey | 350/267 |

FOREIGN PATENT DOCUMENTS

| 925698 | 5/1973 | Canada | 40/452 |
|---|---|---|---|
| 2637703 | 3/1977 | Fed. Rep. of Germany | 350/266 |
| 1911814 | 2/1980 | Fed. Rep. of Germany | 340/783 |
| 1085 | 12/1979 | France | 350/266 |

OTHER PUBLICATIONS

Nassimbene, "Light Shutter", 6/1964, p. 70, IBM Tech. Disc. Bull., vol. 7, #1.
Stuetzer, "Ion Drag Pressure Generation", 7/59, pp. 984–994, J.A.P., vol. 30, #7.
Stuetzer, "Ion Drag Pumps", 1/65, pp. 136–146, J.A.P., vol. 31, #1.
Stuetzer, "Instability of . . . Systems", 12/1959, pp. 642–648, Phys. of Fluids, vol. 2, #6.

Primary Examiner—Nelson Moskowitz
Attorney, Agent, or Firm—Paul K. Godwin, Jr.; Clifford L. Sadler

[57] ABSTRACT

A reflective type light modulator utilizing the principal of ion injection from a switching electrode into a fluid dielectric to effect turbulent forces and the resultant movement of a light reflecting object into and out of a light path. The fluid dielectric and the movable object have similar values of specific gravity.

7 Claims, 3 Drawing Figures

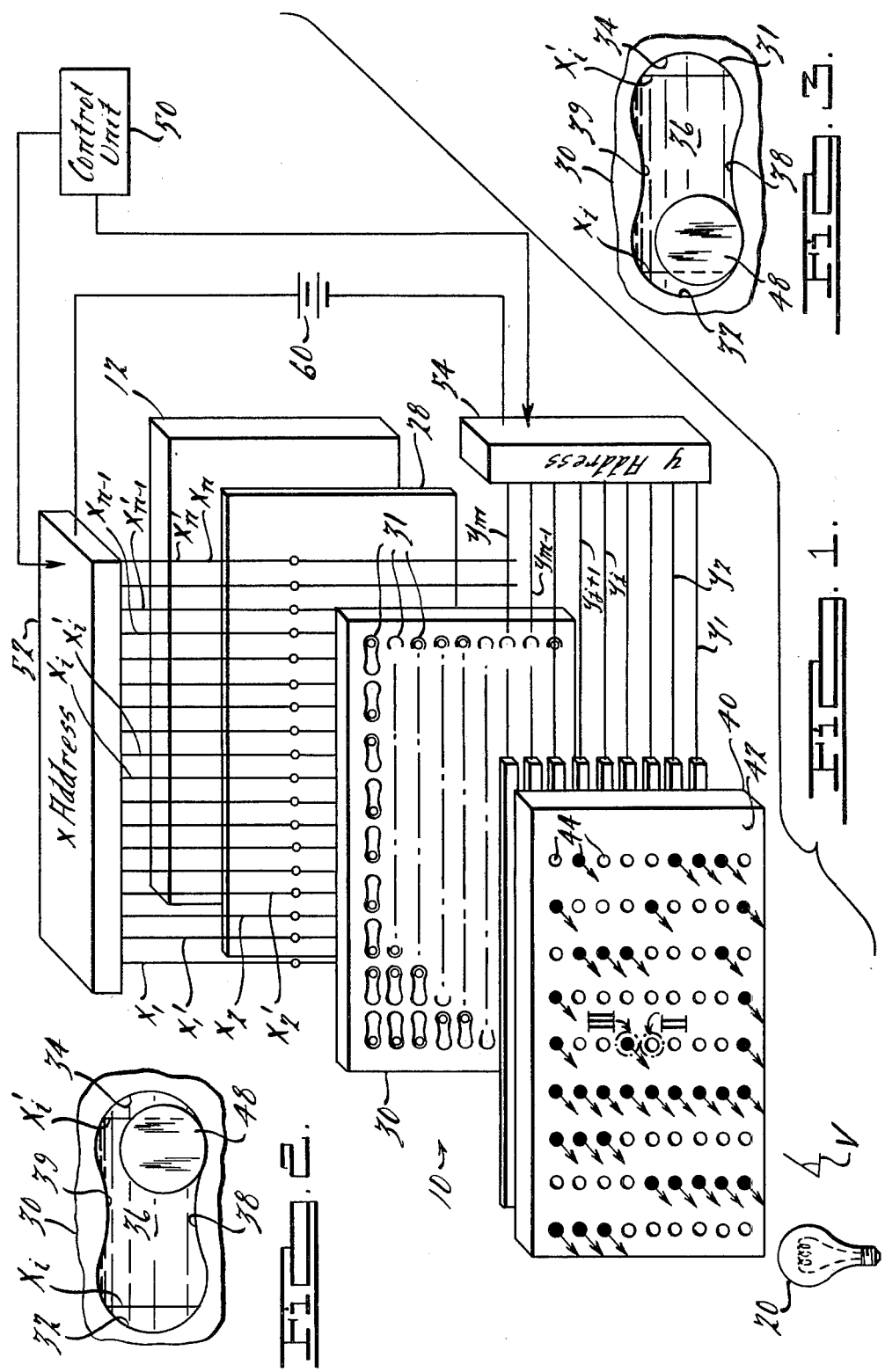

REFLECTING TYPE LIGHT MODULATOR

CROSS-REFERENCE TO RELATED APPLICATION

This invention is related to our commonly assigned U.S. Pat. application Ser. No. 167,174 entitled "Light Modulator" and filed concurrently herewith.

BACKGROUND OF THE INVENTION

1. Field of the Invention:

The present invention relates to the field of light modulation and more specifically to the area of electrically controlled display devices.

2. Description of the Prior Art:

In the development of electrically controlled light modulating type displays for automotive applications, much effort and recent attention has been given to those which employ liquid crystal materials. While liquid crystal displays have adventages of high daylight contrast and low power requirements, they have been found to be inoperable at low temperatures without auxiliary heater provisions and have also been found to degrade with age.

While others are involved with overcoming the aforementioned problems with liquid crystal type displays, our work has been associated with finding alternatives having the same advantages and none of the disadvantages of the liquid crystal type displays.

SUMMARY OF THE INVENTION

We have observed that in a fluid dielectric a positive potential applied to a switching electrode, as referenced from a common electrode, causes a suspended object, having a value of specific gravity similar to that of the fluid dielectric and located between the switching electrode and the common electrode, to move to another location in the fluid. Materials such as mica, glass and several plastic dielectric materials have been found to be usable as responsively positionable objects. We have also determined that ions are injected from the switching electrode and create a turbulence in the fluid dielectric. Those turbulent forces effect the physical displacement of the object away from the path of least resistance between the activated switching electrode and the common electrode.

The present invention is an outgrowth of our observations and overcomes many of the disadvantages of the prior art displays, while having low power requirements to effect a highly contrasting and responsive light modulator. Modulation is achieved by controlling the movement of a solid reflective element in a fluid dielectric medium. The fluid and movable element are located in a fluid-tight cavity having a pair of chambers, whereby the element is movable between the chambers. One of the chambers has a transparent window for receiving and transmitting incident electromagnetic radiation. The locating of the movable reflective element in the windowed chamber causes reflection of the incident light back through the window. Conversely, the locating of the movable reflective element in the windowless chamber allows the incident light to enter the windowed chamber and be absorbed.

Switching electrodes are provided in each chamber, separated from a common electrode. The switching electrodes are utilized to effect movement of the movable element between the chambers when an appropriate voltage is applied with respect to the common electrode. The fluid dielectric is selected so as to be slightly conductive (ionic) and to allow for ion injection from the switching electrodes when individually activated with respect to the common electrode. Ion injection into the fluid creates a slight turbulence in the fluid and the turbulent forces act on the movable element to push it towards the opposite chamber. Periodic activation of the same electode insures that the movable element remains in the desired chamber.

The fluid dielectric and the movable element are selected so that their values of specific gravity (density) are similar. The movable element has been found to be effected by the turbulent forces when its value of specific gravity is either the same as or slightly greater than that of the fluid dielectric. The selection of a movable element having a slightly higher value of specific gravity allows the element to settle in the fluid dielectric and still be responsive to the turbulent forces.

It is, therefore, an object of the present invention to provide a highly responsive light modulator device having low power requirements.

It is another object of the present invention to provide an electrically actuated light modulator device that acts as a light switch for selectively reflecting or absorbing incident light.

It is a still further object of the present invention to provide a highly responsive light modulator device that utilizes a fluid medium and movable solid element having similar values of specific gravity.

BRIEF DESCRIPTION OF THE DRAWINGS

FIG. 1 is an exploded view of the present invention as embodied in an X-Y matrix display system.

FIG. 2 is a detailed view of the present invention activated to a first light absorbing state.

FIG. 3 is a detailed view of the present invention activated to a second light reflecting state.

DETAILED DESCRIPTION OF THE PREFERRED EMBODIMENTS

The present invention is illustrated in FIG. 1 as incorporated in a front lit X—Y matrix display system 10. The system 10 includes a support substrate 12. The front surface 15 of the support substrate 12 is overlayed with a light absorbing opaque film 28. A plurality of pairs of vertically oriented switching electrodes X and X' are arranged overlaying the opaque film 28 so that each switching electrode corresponds to a single column of individual light modulation cells described below.

A solid insulator material 30 is laminated over the pairs of switching electrodes and the opaque film 28. The insulator material 30 contains a matrix of individual cavities 31 which define the individual light modulation cells for the display. A plurality of transparent common Y electrodes overlie the individual rows of cells 31 on the material 30. The common Y electrodes are laminated on the back surface of a light conducting substrate 40; and the light modulator cells 31 are sandwiched between the switching and common electrodes. The substrate 40 is shown as having an opaque mask 42 laminated onto its outer surface. The mask 42 has transparent apertures 44 formed thereon in alignment with one portion of each of the cells 31.

The system 10 is front lit by a light source 20 located out of the line of sight of a viewer, designated at "V".

Control circuitry is schematically represented by a control unit 50 which supplies addressing information to the X address circuit 52 and the Y address circuit 54 for gating the appropriate electrodes to be activated with voltage from a source 60.

The cell shown in FIG. 2 corresponds to the light absorbing cell designated as II in Figure 1. The individual light modulation cell 31 is a fluid tight cavity having a first chamber 32 and a second chamber 34 formed therein. The chamber 32 defines an area of transmission corresponding to the aligned front window 44. A movable element 48, in this case a disc having a generally flat reflective surface disposed parallel to the window, is suspended within a fluid dielectric 36. The material selected for the movable element 48 and that selected for the fluid dielectric 36 have nearly the same value of specific gravity. The relationship of specific gravity of the movable element to that of the fluid dielectric affects the reponsiveness of the device. Therefore, the selection of appropriate materials dictates the degree of responsiveness.

In the present embodiment, acetone, having a specific gravity of approximately 0.8, is selected as the fluid dielectric material 36. Acetone is a weakly conducting electrolyte having a conductivity of approximately $10^6 \Omega$ cm.

The movable element 48 is selected as a disc of reflectively coated polypropylene having a specific gravity of approximately 0.9. while the polypropylene value of specific gravity is slightly higher than that of the acetone fluid dielectric 36, they are sufficiently similar to allow rapid movement of the element 48 between the chambers of the cell. The slightly higher value for the selected polypropylene allows it to settle in the lower part of its cavity location due to the force of gravity.

In FIG. 2, a first thin wire switching electrode $X_i$ is located at one end of chamber 32 and a second thin wire switching electrode $X'_i$ is located at the end of chamber 34. A common transparent electrode $Y_{j+1}$, is common to both the chambers 32 and 34 of the cavity 31 and separate from both of the switching electrodes. The movable element 48 in chamber 34 is located and maintained therein by activation of switching electrode $X_i$ and common electrode $Y_{j+1}$. The location of the movable element in chamber 34 therefore allows light to be transmitted through window 44, transparent electrode $Y_{j+1}$ and absorbed by the film 28.

When a voltage on the order of +40 volts is applied between one of the switching electrodes and the common electrode establishing an electric field gradiant therebetween, ions are injected into the fluid dielectric 36 from the activated switching electrode.

Protrusions 38 and 39 define the inter communicating limits of respective chambers 32 and 34 of the cavity 31 and also provide a mechanical barrier to prevent the movable element 48 from drifting from one chamber to the other. another method of retaining the movable element 48 in its selected location is to periodically pulsate the appropriate switching electrode.

The cell shown in FIG. 3 corresponds to the light reflecting cell designated as III in FIG. 1. The movable element 48 is shown in a light blocking position in chamber 32 and was placed therein by an activation of switching electrode $X'_i$, on the order of +40 volts, as referenced from the common electrode $Y_j$.

In operation, this embodiment of the present invention provides or high speed bilevel cellular display which is non-volatile, in the sense that it need not be updated in order to retain the displayed information. However, if one were to significantly reduce the protrusions 38 and 39 to provide less of a barrier to drift between the chambers, multiplexing techniques may be employed to ensure memory retention.

It will be apparent that many modifications and variations may be effected without departing from the scope of the novel concept of this invention. Therefore, it is intended by the appended claims to cover all such modifications and variations which fall within the true spirit and scope of the invention.

We claim:

1. A device for modulating incident electromagnetic radiation transmitted from a source comprising:
    means in the path of said radiation for providing a fluid-tight cavity having first and second chambers, wherein said first one of said chambers contains a window and a light absorbing medium and said second one of said chambers is opaque to said radiation;
    a radiation reflecting element within said cavity and movable between said first and second chambers, wherein said element reflects said incident radiation from said first chamber when located within said first chamber between said window and said light absorbing medium and does not reflect said incident radiation when located within said second chamber and said element has a predetermined value of specific gravity;
    means including a first switching electrode in said first chamber, a second switching electrode in said second chamber and a common electrode in said cavity spaced from said first and second switching electrodes for controlling the movement of said element between first and second chambers;
    said controlling means further includes means for selectively applying an electrical potential between said common electrode and said first electrode to effect movement of said element from said first chamber to said second chamber and for selectively applying an electrical potential between said common electrode and said second electrode to effect movement of said element from said second chamber to said first chamber; and
    a transparent fluid dielectric occupying the remainder of said cavity and having a value of specific gravity approximately equal to said predetermined value, whereby the application of said electrical potential produces ion injection into said fluid dielectric and resultant turbulent forces on said element to effect its movement.

2. A modulator as in claim 1, wherein said common electrode occupies portions of both chambers.

3. a modulator as in claim 1, wherein said fluid dielectric is acetone and said reflecting element is a polypropylene disc.

4. An electrically activated light modulator comprising:
    means defining a fluid-tight cavity with two intercommunicating chambers and a transparent window in a first one of said chambers;
    a light reflecting element within said cavity, occupying a portion of one of said chambers and being physically movable between said chambers for reflecting incident light through said transparent window wehen located in said first chamber; wherein said reflecting element has a known value of specific gravity;
    said cavity further includes a first switching electrode in said first chamber, a second switching electrode in said second chamber and a common electrode spaced from said first and second switching electrodes;

a fluid dielectric occupying the remainder of said cavity and having a value of specific gravity approximately equal to that of said reflecting element;

a source of voltage potential; and means for switchably applying said voltage potential between said common electrode and said first switch electrode to thereby produce ion injection into said fluid dielectric and resultant turbulent forces that locate said reflecting element in said second chamber and for switchably applying said voltage potential between said common electrode and said second switching electrode to produce turbulent forces that locate said element in said first chamber.

5. A modulator as in claim 4, herein said dielectric defining means comprises acetone.

6. A modulator as in claim 4, wherein said reflecting element comprises a disc of polypropylene.

7. A modulator as in claim 4, wherein said first chamber of said cavity includes means for absorbing incident light transmitted through said first transparent window when said reflecting element is located in said second chamber.

* * * * *